(12) United States Patent
Wang et al.

(10) Patent No.: US 12,120,032 B2
(45) Date of Patent: *Oct. 15, 2024

(54) TENANT-SPECIFIC QUALITY OF SERVICE

(71) Applicant: VMware LLC, Palo Alto, CA (US)

(72) Inventors: Yong Wang, San Jose, CA (US);
Xinhua Hong, Milpitas, CA (US);
Sreeram Kumar Ravinoothala, San Jose, CA (US); Dexiang Wang, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,591

(22) Filed: Oct. 22, 2022

(65) Prior Publication Data

US 2023/0041869 A1 Feb. 9, 2023

Related U.S. Application Data

(63) Continuation of application No. 16/741,457, filed on Jan. 13, 2020, now Pat. No. 11,483,246.

(51) Int. Cl.
*H04L 47/24* (2022.01)
*H04L 12/66* (2006.01)

(52) U.S. Cl.
CPC .............. *H04L 47/24* (2013.01); *H04L 12/66* (2013.01)

(58) Field of Classification Search
CPC ................................ H04L 12/66; H04L 47/24
See application file for complete search history.

(56) References Cited

U.S. PATENT DOCUMENTS

| 7,516,487 | B1 | 4/2009 | Szeto et al. |
| 7,734,895 | B1 | 6/2010 | Agarwal et al. |
| 8,509,068 | B2 | 8/2013 | Begall et al. |
| 9,378,049 | B1 | 6/2016 | Johnson |

(Continued)

FOREIGN PATENT DOCUMENTS

| CN | 106059960 A | 10/2016 |
| CN | 109547502 A | 3/2019 |

OTHER PUBLICATIONS

Seddiki, M. Said, et al., "FlowQoS: QoS for the Rest of US," HotSDN '14, Aug. 22, 2014, 2 pages, ACM, Chicago, IL, USA.

*Primary Examiner* — Syed Ali
*Assistant Examiner* — Kai Chang
(74) *Attorney, Agent, or Firm* — Quarles & Brady LLP

(57) ABSTRACT

Some embodiments provide, for a gateway datapath that executes on a gateway device to implement tenant logical routers for multiple different tenant logical networks and process traffic between the tenant logical networks and an external network, a method for managing QoS for the plurality of tenant logical networks. The method receives a data message for a particular tenant logical network. The method executes a set of processing stages to process the data message. The set of processing stages includes a processing stage for a particular tenant logical router of the particular tenant logical network. As part of the processing stage for the particular tenant logical router, the method uses a QoS data structure specific to the particular tenant logical router to determine whether to allow the data message. The gateway device stores at least one separate QoS data structure for each of a set of the tenant logical routers.

20 Claims, 8 Drawing Sheets

(56) References Cited

U.S. PATENT DOCUMENTS

| | | |
|---|---|---|
| 9,942,144 B1 | 4/2018 | Ramalingam et al. |
| 10,778,721 B1 | 9/2020 | Holbrook et al. |
| 10,833,992 B1 | 11/2020 | Dickinson |
| 10,880,121 B1 | 12/2020 | Nirmala et al. |
| 10,897,420 B1 | 1/2021 | Pianigiani et al. |
| 11,483,246 B2 | 10/2022 | Wang et al. |
| 11,539,633 B2 | 12/2022 | Wang et al. |
| 11,599,395 B2 | 3/2023 | Wang et al. |
| 2003/0081546 A1 | 5/2003 | Agrawal et al. |
| 2003/0231648 A1* | 12/2003 | Tang ............ H04L 47/10 370/450 |
| 2005/0066166 A1 | 3/2005 | Chin et al. |
| 2007/0253439 A1 | 11/2007 | Iny |
| 2008/0222730 A1 | 9/2008 | Ford et al. |
| 2009/0016336 A1 | 1/2009 | LaVigne et al. |
| 2009/0119750 A1 | 5/2009 | Sembugamoorthy et al. |
| 2009/0129271 A1 | 5/2009 | Ramankutty et al. |
| 2009/0161682 A1 | 6/2009 | Johnson et al. |
| 2009/0300759 A1 | 12/2009 | Wang et al. |
| 2010/0135287 A1 | 6/2010 | Hosain et al. |
| 2011/0176418 A1 | 7/2011 | Gershinsky et al. |
| 2012/0051218 A1 | 3/2012 | Mohandoss et al. |
| 2012/0081580 A1 | 4/2012 | Côté et al. |
| 2013/0058229 A1 | 3/2013 | Casado et al. |
| 2013/0125120 A1 | 5/2013 | Zhang et al. |
| 2013/0185436 A1* | 7/2013 | Carlin ............ G06F 9/5011 709/226 |
| 2013/0191257 A1* | 7/2013 | Koodli ............ H04L 12/4633 709/217 |
| 2014/0052877 A1 | 2/2014 | Mao |
| 2014/0153422 A1 | 6/2014 | Nambiar et al. |
| 2014/0156720 A1 | 6/2014 | Janakiraman et al. |
| 2015/0016286 A1 | 1/2015 | Ganichev et al. |
| 2015/0016469 A1 | 1/2015 | Ganichev et al. |
| 2015/0113133 A1 | 4/2015 | Srinivas et al. |
| 2015/0244630 A1 | 8/2015 | Madem et al. |
| 2015/0256466 A1 | 9/2015 | Roitshtein et al. |
| 2015/0263899 A1 | 9/2015 | Tubaltsev et al. |
| 2015/0271303 A1* | 9/2015 | Neginhal ............ H04L 49/70 370/392 |
| 2015/0281277 A1 | 10/2015 | May et al. |
| 2016/0014634 A1 | 1/2016 | Liu et al. |
| 2016/0057166 A1 | 2/2016 | Chesla |
| 2016/0080211 A1 | 3/2016 | Anand et al. |
| 2016/0105333 A1 | 4/2016 | Lenglet et al. |
| 2016/0164910 A1 | 6/2016 | Tang |
| 2016/0182255 A1 | 6/2016 | Liu et al. |
| 2016/0218918 A1 | 7/2016 | Chu et al. |
| 2017/0118042 A1 | 4/2017 | Bhattacharya et al. |
| 2017/0149648 A1 | 5/2017 | Yang et al. |
| 2017/0317954 A1* | 11/2017 | Masurekar ........ H04L 41/0894 |
| 2018/0091547 A1 | 3/2018 | Pierre |
| 2018/0157515 A1 | 6/2018 | Malloy et al. |
| 2018/0176181 A1 | 6/2018 | Fu et al. |
| 2018/0262599 A1 | 9/2018 | Firestone |
| 2018/0279161 A1 | 9/2018 | Chen et al. |
| 2018/0285151 A1 | 10/2018 | Wang et al. |
| 2018/0309632 A1* | 10/2018 | Kompella ........ H04L 41/0866 |
| 2018/0309640 A1 | 10/2018 | Nagarajan et al. |
| 2018/0359134 A1 | 12/2018 | Pech et al. |
| 2019/0007330 A1 | 1/2019 | Browne et al. |
| 2019/0014051 A1 | 1/2019 | Briscoe et al. |
| 2019/0044809 A1 | 2/2019 | Willis et al. |
| 2019/0081899 A1 | 3/2019 | Mundkur et al. |
| 2019/0108068 A1 | 4/2019 | Britkin et al. |
| 2019/0182367 A1 | 6/2019 | Kim et al. |
| 2019/0334868 A1 | 10/2019 | Tewari et al. |
| 2020/0278892 A1 | 9/2020 | Nainar et al. |
| 2020/0413283 A1 | 12/2020 | Shen et al. |
| 2021/0067489 A1 | 3/2021 | Jayawardena et al. |
| 2021/0176168 A1 | 6/2021 | Eckert et al. |
| 2021/0218677 A1 | 7/2021 | Wang et al. |
| 2021/0227424 A1 | 7/2021 | Wang et al. |
| 2021/0255903 A1 | 8/2021 | Wang et al. |
| 2021/0399920 A1 | 12/2021 | Sundararajan et al. |
| 2022/0070102 A1 | 3/2022 | Wang et al. |
| 2022/0158922 A1 | 5/2022 | Srivastava |
| 2022/0264360 A1 | 8/2022 | Chen et al. |
| 2022/0393983 A1 | 12/2022 | Wang et al. |
| 2023/0130529 A1 | 4/2023 | Wang et al. |
| 2023/0168947 A1 | 6/2023 | Wang et al. |

* cited by examiner

TENANT-SPECIFIC QUALITY OF SERVICE

CLAIM OF BENEFIT TO PRIOR APPLICATION

This application is a continuation application of U.S. patent application Ser. No. 16/741,457, filed Jan. 13, 2020, now published as U.S. Patent Publication 2021/0218677. U.S. patent application Ser. No. 16/741,457, now published as U.S. Patent Publication 2021/0218677, is incorporated herein by reference.

BACKGROUND

Quality of service (QOS) mechanisms are important in datacenters, in order to guarantee contracted—for levels of performance. However, rate-limiting mechanisms are generally performed in hardware (e.g., at the network interface controller (NIC) level), which aggregates all tenants of a datacenter together. Traffic is typically tenant-independent at the hardware level, and therefore difficult to disaggregate.

BRIEF SUMMARY

Some embodiments provide a gateway datapath, executing on a gateway device, that manages quality of service (QOS) for multiple different tenant logical networks. The gateway datapath implements tenant logical routers for the different logical networks to process traffic between the tenant logical networks and an external network. In some embodiments, upon receiving a data message (either from the external network or from a tenant logical network), the gateway datapath executes a set of processing stages to process (e.g., forward, drop, etc.) the data message. This set of processing stages may include multiple stages corresponding to different logical forwarding elements (such as logical switches and logical routers), including a stage for the tenant logical router of the logical network with which the data message is associated. As part of the processing for the tenant logical router, the gateway datapath uses a QoS data structure specific to that tenant logical router in order to determine whether to allow (or drop) the data message. In some embodiments, if the data message is allowed, the gateway datapath also updates the QoS structure to reflect the amount of data that was transmitted for the tenant logical router.

In some embodiments, the gateway device stores separate QoS data structures for each tenant logical router implemented by the gateway datapath (e.g., one QoS data structure for ingress traffic and one QoS data structure for egress traffic, per tenant logical router). Each QoS data structure, in some embodiments, includes several parameters which have different read/write properties. For instance, in some embodiments, each QoS data structure includes (i) a burst size parameter that specifies a maximum amount of data that the gateway datapath is allowed to process for the respective tenant logical network at peak bandwidth and (ii) a bandwidth parameter that specifies a committed rate for the gateway datapath to process data for the respective tenant logical router. These parameters are read-only in some embodiments, and are set according to a configuration of the tenant logical router in some embodiments (e.g., by a network administrator).

The QoS data structures each also include a token value in some embodiments that specifies a current amount of data that can be processed for the corresponding tenant logical router. When the gateway datapath uses the QoS data structure to determine whether to allow or drop a data message, the datapath reads the token value of the appropriate QoS data structure and compares this token value to the size of the data message. If the data message is smaller than the current token value, then the data message does not violate the QoS rate restrictions and is allowed to be transmitted.

The gateway datapath updates the token values of each of the QoS data structure at regular intervals in some embodiments (these intervals may be the same for all of the QoS data structures or may be set per tenant logical router). Specifically, for a specific token value, in some embodiments the gateway datapath (i) subtracts from the token value the amount of data processed for the tenant logical router corresponding to that token value since the previous update to the token value and (ii) adds to the token value an amount of data equal to the bandwidth parameter of the QoS data structure for the particular tenant logical router multiplied by an amount of time from the prior update to the current updating of the token value. This addition is also limited by the burst size parameter, which places a cap on the token value (such that the token value can never be set larger than the burst size parameter), while the subtraction is limited such that the token value does not drop below zero.

The gateway datapath, in some embodiments, runs multiple packet-processing threads, each of which executes on a different core of a processing unit or set of processing units (e.g., CPUs) of the gateway device. If using a hash-based load balancing mechanism that distributes data messages to the different cores of the processor (e.g., receive side scaling), then multiple threads will process data for the same tenant logical router. If each of these threads were allowed to write to the token value parameters of the QoS data structures, then locks would be required, which would drastically reduce processing speed for the data messages (i.e., preventing the datapath from processing data messages at line rate or even close to line rate).

To solve this problem, some embodiments include, in each QoS data structure, an additional parameter for each core that indicates an amount of data that has been processed by the core for the corresponding tenant logical router. Each packet processing thread is allowed to write only to the additional parameter (in each QoS data structure) for its corresponding core, to add to this parameter. The gateway datapath also runs a separate update thread that is not tied to any of the cores, in some such embodiments. This update thread handles updating the token values of the QoS data structures at regular time intervals (as mentioned, these may be separate intervals for each QoS data structure or a single interval for all of the data structures). The update thread, when updating a particular QoS data structure, uses the bandwidth parameter of the data structure multiplied by the time interval since the last update to add a particular amount of data to the token value (capped by the burst size parameter). In addition, the update thread reads the additional parameters updated by the packet processing threads and subtracts the sum of those parameters from the total. In some embodiments, these additional parameters (referred to as consumption parameters) are not reset at each interval, so the update thread also stores (e.g., as an additional parameter of the QoS data structure) a parameter that indicates the amount of data previously subtracted from the token value due to the consumption parameters (i.e., the amount of data cumulatively allowed by the gateway datapath across all of the cores prior to the previous update of the token value). This allows the update thread to, at each interval, only subtract the new amounts added to the consumption parameters since the previous update to the token value.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a gateway datapath, executing on a gateway device, that manages quality of service (QOS) for multiple different tenant logical networks. The gateway datapath implements tenant logical routers for the different logical networks to process traffic between the tenant logical networks and an external network. In some embodiments, upon receiving a data message (either from the external network or from a tenant logical network), the gateway datapath executes a set of processing stages to process (e.g., forward, drop, etc.) the data message. This set of processing stages may include multiple stages corresponding to different logical forwarding elements (such as logical switches and logical routers), including a stage for the tenant logical router of the logical network with which the data message is associated. As part of the processing for the tenant logical router, the gateway datapath uses a QoS data structure specific to that tenant logical router in order to determine whether to allow (or drop) the data message. In some embodiments, if the data message is allowed, the gateway datapath also updates the QoS structure to reflect the amount of data that was transmitted for the tenant logical router.

Figure 1:
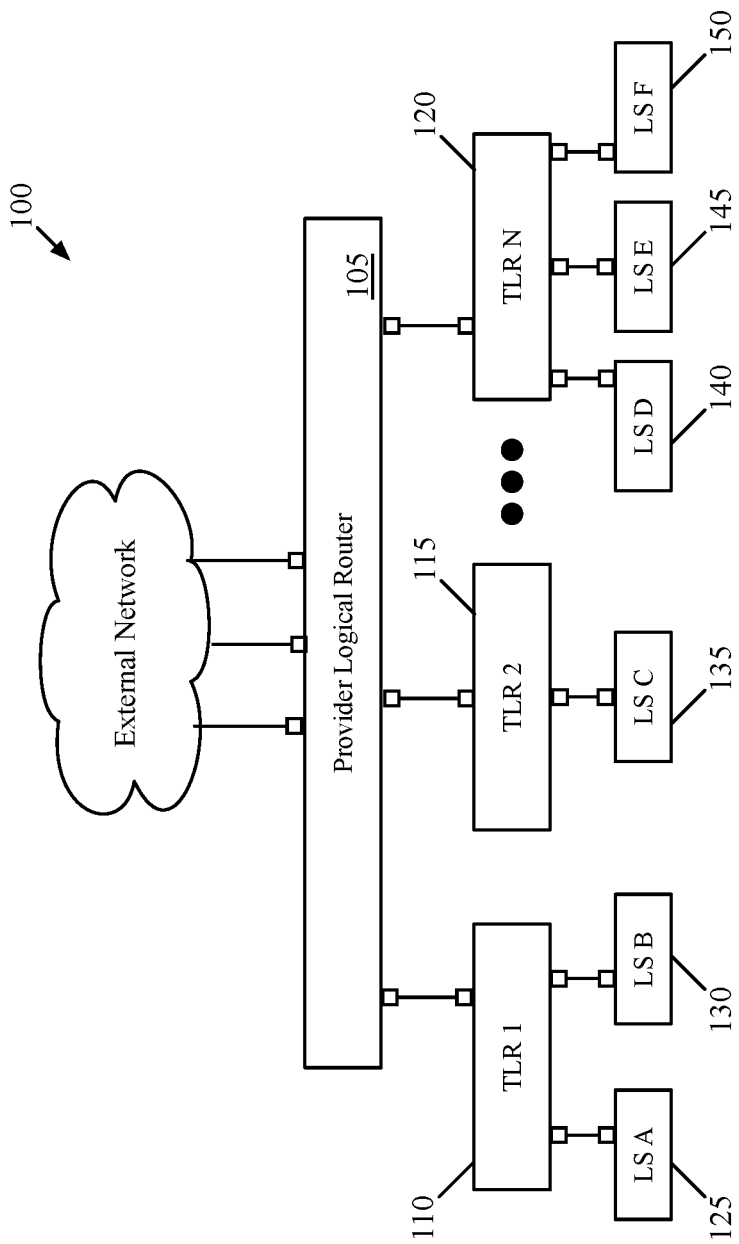
FIG. 1 conceptually illustrates a logical network architecture with multiple tenant logical networks.

FIG. 1 conceptually illustrates a logical network architecture 100 with multiple tenant logical networks. In some embodiments, a logical network is a conceptualization of a network (e.g., for a datacenter tenant) that is defined by a network administrator. Such logical networks may include logical forwarding elements (e.g., logical routers, logical switches) as well as various other logical network entities (e.g., firewalls, load balancers, etc.). In the physical network (e.g., a datacenter network), these logical networks are implemented by various physical forwarding elements (e.g., software forwarding elements such as virtual switches, hardware forwarding elements such as top-of-rack switches, etc.), such that data messages sent by logical network endpoints (e.g., virtual machines or other data compute nodes) are processed as though sent through a physical network with the structure of the logical network. This formulation allows for many logical networks to be implemented (e.g., as overlay networks) by the physical network elements. That is, a single software switch might implement many logical networks for many different tenants.

As shown, the logical network architecture 100 includes a provider logical router (PLR) 105 that provides access to external networks. In addition, multiple tenant logical routers (TLRs) 110-120 connect to the PLR 105, and logical switches 125-150 each connect to one of these TLRs 110-120. In addition, various logical network endpoints such as virtual machines (VMs), containers, physical computing devices, or other data compute nodes (DCNs) may be attached to the logical switches.

In some embodiments, each TLR is configured by a different datacenter tenant (e.g., via an application that only allows the tenant to manage their own logical network), while the PLR is configured by a datacenter administrator (e.g., a cloud provider). Each of the tenants also configures the logical switches that connect to their respective TLRs. In some embodiments, any number of TLRs may be attached to a PLR such as the PLR 105. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR. Part of the routing table for a PLR includes routes for all of the logical switch domains of its TLRs, so attaching numerous TLRs to a PLR creates several routes for each TLR just based on the subnets attached to the TLR.

A network control system of some embodiments (e.g., a set of network controller applications and/or network management applications) is responsible for receiving the logical network configurations from the tenants, generating configuration data for allowing the various physical network elements to implement the logical networks, and distributing this data to these physical network elements. In some embodiments, the network control system receives configuration data for a TLR from a network administrator and defines multiple routing components for the logical router. For instance, some embodiments define a distributed routing component (DR) and one or more centralized routing components (also referred to as service routers, service routing components, or SRs), each of which has a separate routing table and separate set of interfaces. In addition, the network control system defines transit logical switches for logically switching data messages between the routing components in some embodiments, as well as between the TLRs and the PLRs.

For instance, the network control system of some embodiments would receive configuration data for the TLR 110, and generate a DR and two SRs (one active and one standby). In addition, the network control system would generate a first transit logical switch to connect these routing components and a second transit logical switch to connect the TLR 110 to the PLR 105. Further discussion of the different routing components and transit logical switches can be found in U.S. Pat. No. 9,787,605, which is incorporated herein by reference.

The DRs and logical switches are implemented in a distributed manner in some embodiments. That is, a single DR or logical switch is implemented by many different physical forwarding elements. For instance, a virtual switch executing on a host computer that hosts a DCN connected to logical switch 125 might implement at least logical switches 125 and 130 as well as the DR for TLR 110 (and the transit logical switch internal to the implementation of TLR 110).

Each SR, on the other hand, is implemented on a single physical computer in some embodiments. Such a physical computer might implement multiple SRs, as well as the various DRs and logical switches. For instance, some embodiments designate gateway devices for implementing the SRs of the TLRs, as well as the SRs of the PLRs. In some embodiments, these gateway devices implement a gateway datapath (e.g., using the data plane development kit (DPDK), a set of libraries and network interface controller (NIC) drivers for packet processing) that performs the data message processing for the SRs (as well as the distributed network entities of the logical networks).

Figure 2:
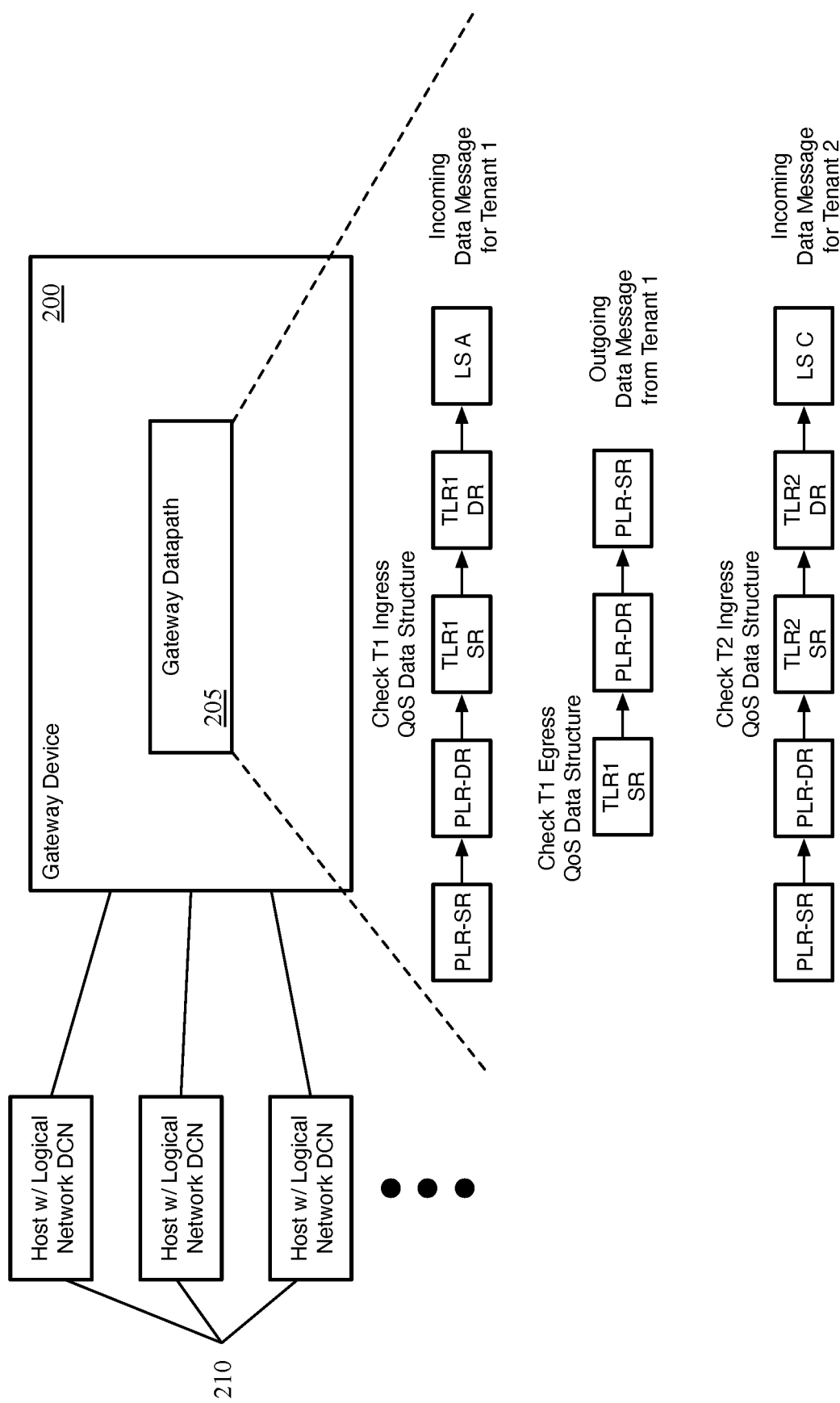
FIG. 2 conceptually illustrates a gateway device that executes a gateway datapath.

FIG. 2 conceptually illustrates such a gateway device 200 that executes a gateway datapath 205. The gateway datapath, in different embodiments, may execute in virtualization software of the gateway device 200 (e.g., if the gateway device is a host computer that also hosts various DCNs) or as an application/daemon on a bare metal device. As shown, various host computers 210 that host one or more logical network DCNs connect (through the physical network of the datacenter) to the gateway device 200. These logical network DCNs exchange data traffic with each other (which may not require processing by the gateway datapath 205) as well as with external endpoints.

Data traffic between the logical network DCNs and the external endpoints is transmitted through the gateway datapath 205 of the device 200. In some embodiments, at least for the first packet of a data flow in each direction, the gateway datapath executes a multi-stage processing pipeline. This processing pipeline is described in further detail in U.S. Pat. No. 10,084,726, which is incorporated herein by reference. At each stage, the gateway datapath 205 of some embodiments reads configuration data for the stage and performs processing according to that configuration data (e.g., to determine how to switch and/or route a data message, to perform load balancing and/or network address translation, etc.).

As described in U.S. Pat. Nos. 9,787,605 and 10,084,726, which are incorporated by reference above, the packet processing pipeline is different for ingress and egress packet processing pipelines in some embodiments, as the physical forwarding elements implementing the logical networks perform first-hop processing. For egress packets (originating at the logical network DCNs), a software forwarding element executing on the host computer that hosts the source DCN is the first-hop forwarding element. This software forwarding element would perform logical processing for the initial logical switch and the DR of the TLR, before the transit logical switch of the TLR determines that (i) the data message is to be sent to the SR of the TLR and (ii) that this requires transmission through the physical datacenter network to the gateway device 200. As such, FIG. 2 illustrates that for an outgoing (egress) data message for tenant 1, the processing at the gateway datapath 205 begins with the SR of the TLR 110 for tenant 1. As part of this processing, the gateway datapath checks a QoS data structure (described in greater detail below) associated with egress processing for the TLR 110 for tenant 1. Assuming the data message is allowed (i.e., not dropped), the processing pipeline for this data message also includes stages for the DR and SR of the PLR 105 (in addition to the transit logical switches between these routing components, which are not shown in the figure).

For incoming messages, the gateway device 200 is the first-hop forwarding element, so the gateway datapath 205 performs more extensive logical processing. As shown, when the gateway datapath 205 receives a data message for tenant 1, the processing pipeline includes stages for the SR and DR of the PLR 105 as well as the SR and DR of the TLR 110 (in addition to the three transit logical switches between these various routing components), then the logical switch 125. As part of this processing for the SR of the TLR, the gateway datapath checks a QoS data structure associated with ingress processing for the TLR 110 for tenant 1. A similar processing pipeline is executed by the gateway datapath 205 for incoming data messages for tenant 2, except that the TLR and logical switch stages use configuration data for TLR 115 and logical switch 135. In addition, as part of the processing for the SR of the TLR, the gateway datapath checks a QoS data structure associated with ingress processing for the TLR 115 for tenant 2. In some embodiments, as mentioned, the gateway device stores two separate QoS data structures for each tenant logical router (one for ingress and one for egress).

It should be noted that in some other embodiments, there is no PLR (i.e., the TLRs connect directly to physical routers of the external network). In this case, the datapath uses other mechanisms (e.g., associating different TLRs with different interfaces) to determine which TLR configuration to use for processing incoming data messages. In yet other embodiments, the PLR SR is implemented on a different gateway device. In this case, the PLR DR processing stage is executed as part of the gateway datapath with the TLR SR for egress data messages, but as part of the gateway datapath on the other device with the PLR SR for ingress data messages. The use of different QoS data structures for different tenants (and for ingress/egress) is not dependent on whether or not a PLR is part of the logical processing pipeline.

In addition, it should be noted that in some embodiments the PLRs and TLRs do not necessarily correspond to datacenter providers and tenants. In some embodiments, the PLRs are a tier of logical routers that provide a direct connection to the external networks while the TLRs are a tier of logical routers that are not allowed to directly connect to external networks, but which can provide services for data compute nodes that connect to sets of logical switches. In some such embodiments, the use of different QoS structures for different logical routers of the latter tier (the TLRs) is not dependent on whether or not these different logical routers actually correspond to different tenants.

The gateway device 200 of some embodiments includes a network interface controller (NIC) via which data messages are sent and received (e.g., a NIC connected to an external router), and a set of processing units such as one or more CPUs. Such a set of CPUs may have multiple cores for processing data messages, with data messages load balanced between the cores (e.g., using receive side scaling (RSS) or another load balancing technique).

Figure 3:
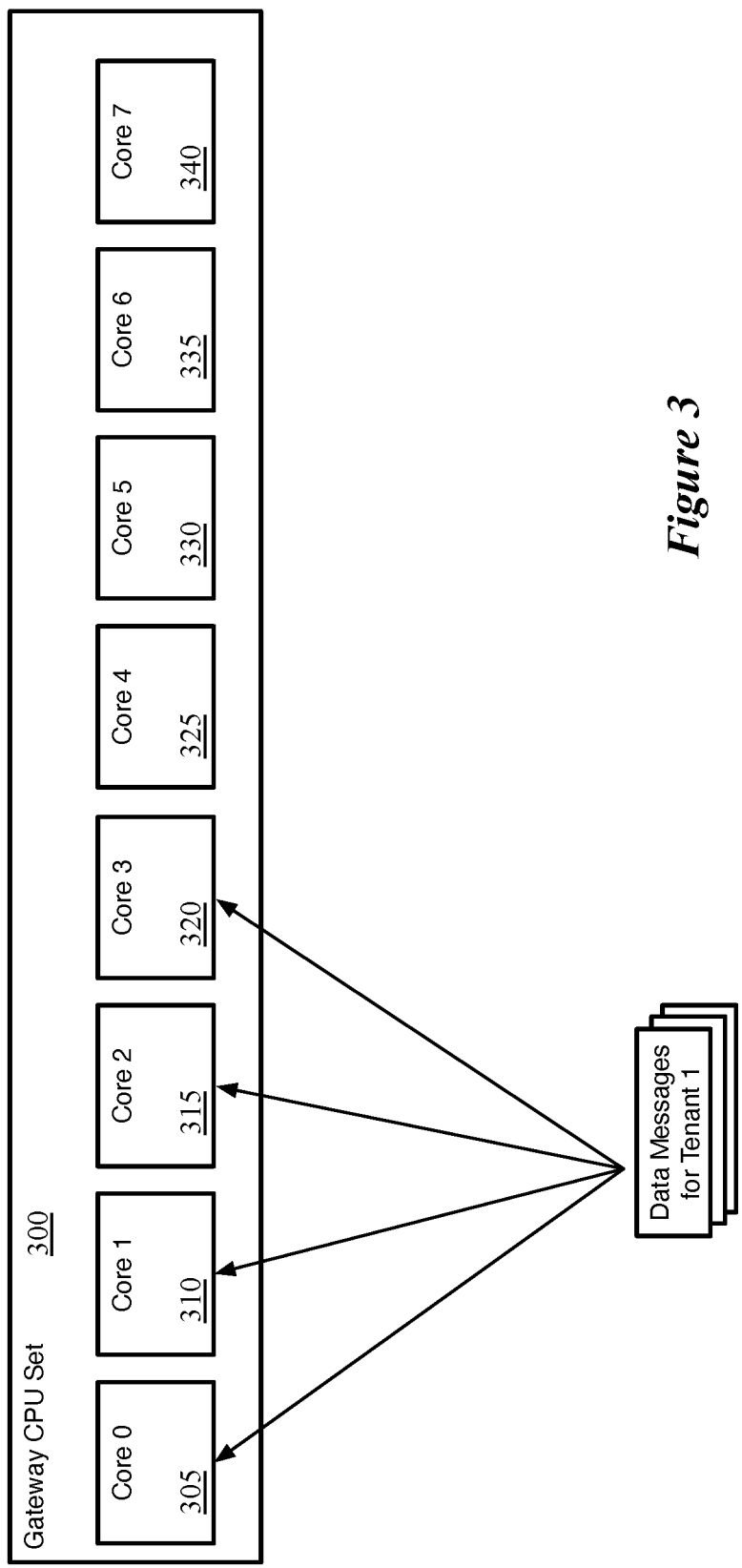
FIG. 3 conceptually illustrates a set of processing units of a gateway device, with eight cores.

FIG. 3 conceptually illustrates such a CPU set 300 of a gateway device, with eight cores 305-340. Ingress data messages received at the NIC 300 are distributed across four of the cores 305-320 using a hash-based load balancing technique (e.g., RSS). In different embodiments, the CPU set 300 of the gateway device may have different numbers of cores available to the gateway datapath (e.g., more or less than the eight shown here), and different numbers of the available cores may be assigned for processing data messages.

In some embodiments, the load balancing technique computes a hash value of various data message headers that are independent of the tenant logical router (e.g., both source and destination network addresses), such that data messages for one tenant logical network are distributed across all four of the cores as shown in the figure. Some such embodiments track the cores to which ingress data messages for various data flows are assigned, and assign egress data messages for corresponding data flows to the same core.

Figure 4:
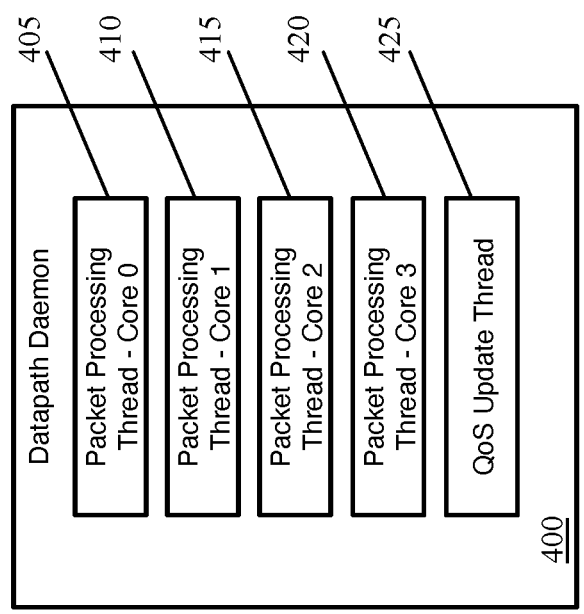
FIG. 4 conceptually illustrates the threads executed by a datapath daemon of some embodiments.

The gateway datapath, in some embodiments, executes multiple packet-processing threads, each of which executes on a different core of the CPU set. FIG. 4 conceptually illustrates the threads executed by a datapath daemon 400 of some embodiments. As mentioned, the gateway datapath is a daemon or other application that can execute in virtualization software of a host computer or on a bare-metal device. This daemon 400 in some embodiments uses DPDK to provide accelerated data message processing using the NIC of the gateway device. As shown in FIG. 4, the datapath daemon 400 executes one packet-processing thread 405-420 for each core of the NIC 300. In some embodiments, these are run-to-completion threads that can process data messages simultaneously (i.e., each of the four cores 305-320 can simultaneously process a data message). In addition, the datapath daemon 400 executes a QoS update thread 425 that is used to update the QoS data structures for the various tenant logical routers, as well as threads for other purposes such as BFD, MAC learning, etc. (these threads are not shown here). In some embodiments, the QoS update thread 425 (as well as any other threads besides the packet-processing threads 405-420) are scheduled among the cores not assigned for packet processing (e.g., cores 325-340 in the example above).

Figure 5:
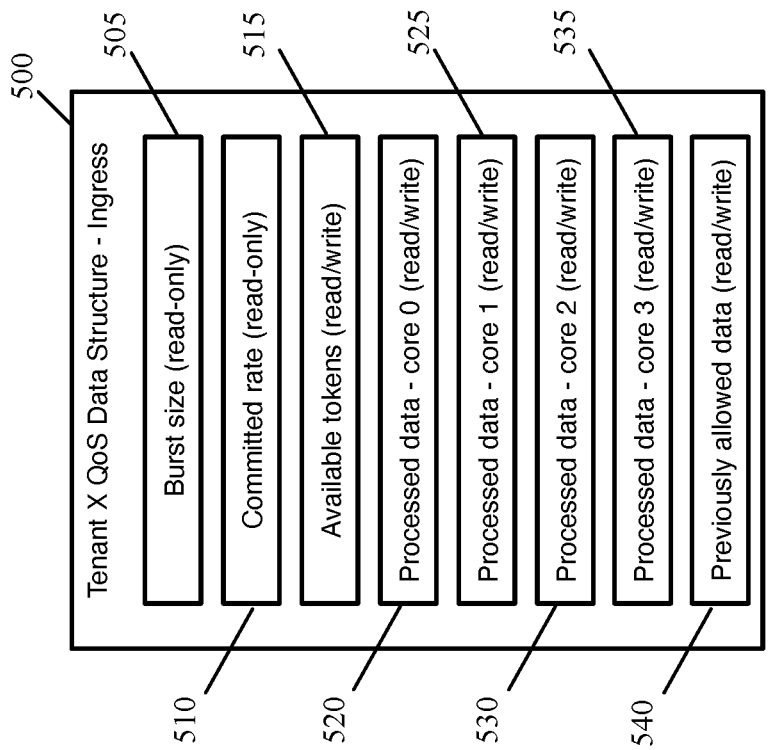
FIG. 5 conceptually illustrates a QoS data structure of some embodiments.

As mentioned, the gateway device stores separate QoS data structures for each TLR implemented by the gateway datapath (e.g., one QoS data structure for ingress traffic and one QoS data structure for egress traffic, per TLR). Each QoS data structure, in some embodiments, includes several parameters which have different read/write properties. FIG. 5 conceptually illustrates a QoS data structure 500 of some embodiments. This specific example is for ingress traffic of the TLR for tenant 2's logical network, but in some embodiments each of the QoS data structures has the same set of parameters having the same read/write properties.

As shown, the QoS data structure 500 includes a burst size parameter 505, a bandwidth parameter 510, a token value 515, and processed data parameters 520-535 for each core of the CPU set assigned for packet processing. The burst size parameter 505 specifies a maximum amount of data that the gateway datapath is allowed to process for the respective tenant logical network at peak bandwidth, while the bandwidth parameter 510 specifies a committed rate for the gateway datapath to process data for the respective tenant logical router. These parameters are read-only in some embodiments, and are set according to a configuration of the TLR in some embodiments (e.g., by a network administrator).

The token value 515, in some embodiments, specifies a current amount of data that can be processed by the gateway datapath for the corresponding TLR. When the gateway datapath uses the QoS data structure to determine whether to allow or drop a data message, the datapath reads the token value of the appropriate QoS data structure and compares this token value to the size of the data message. If the data message is smaller than the current token value 515, then the data message does not violate the QoS rate restrictions and is allowed to be transmitted. This parameter 515 is a read/write parameter, as it is updated by the gateway datapath at regular intervals in some embodiments (these intervals may the same for all of the QoS data structures or may be set per tenant logical router).

Specifically, for a given token value, in some embodiments the gateway datapath (i) subtracts from the token value the amount of data processed for the tenant logical router corresponding to that token value since the previous update to the token value and (ii) adds to the token value an amount of data equal to the bandwidth parameter of the QoS data structure for the particular tenant logical router multiplied by an amount of time from the prior update to the current updating of the token value. This addition is also limited by the burst size parameter, which places a cap on the token value (such that the token value can never be set larger than the burst size parameter).

If using a hash-based load balancing mechanism (e.g., RSS) that distributes data messages to the different cores of the CPU set, then multiple threads of the datapath will process data for the same TLR. If each of these threads were allowed to write to the token value parameters of the QoS data structures (i.e., by subtracting from the token value the size of each data message processed by the thread), then locks would be required, which would drastically reduce processing speed for the data messages (i.e., preventing the datapath from processing data messages at line rate or even close to line rate).

To solve this problem, in some embodiments each QoS data structure includes an additional parameter 520-535 for each core that indicates an amount of data that has been processed by the core for the corresponding TLR (in the corresponding direction). Like the token value parameter 515, these additional processed data parameters 520-535 are read/write. In this case, however, each packet processing thread is allowed to write only to the additional parameter (in each QoS data structure) for its corresponding core, to add to this parameter. For instance, the packet processing thread 405 is only allowed to write to parameter 520 (and parameter 520 can only be written to by packet processing thread 405), the packet processing thread 410 is only allowed to write to parameter 525 (and parameter 525 can only be written to by packet processing thread 410), etc.

As mentioned above, the gateway datapath 400 of some embodiments also runs a separate QoS update thread 425 that is not tied to any of the cores. This QoS update thread 425 handles updating the token value parameters 515 of the QoS data structures at regular time intervals (as mentioned, these may be separate intervals for each QoS data structure or a single interval for all of the data structures). That is, this QoS update thread 425 has write permission for the token value parameter 515 and read-only permissions for the additional processed data parameters 520-535 (as well as the burst size parameter 505 and bandwidth parameter 510). The QoS update thread 425, when updating a particular QoS data structure, uses the bandwidth parameter 510 of that data structure multiplied by the time interval since the previous update to add a particular amount of data to the token value parameter 515 (capped by the burst size parameter 505).

In addition, the QoS update thread 425 reads the additional processed data parameters 520-535 updated by the packet processing threads and subtracts the sum of those processed data parameters from the total. In some embodiments, these additional parameters 520-535 (referred to as consumption parameters) are not reset at each interval, so the update thread 425 also computes and stores a previously allowed data parameter 540 that indicates the amount previously subtracted from the token value 515 due to the additional data processed parameters 520-535 (i.e., the amount of data that has been allowed by the gateway datapath for the corresponding TLR in the direction represented by the QoS data structure 500. This allows the update thread 425 to, at each interval, only subtract the new amounts added to the data processed parameters 520-535 since the previous update to the token value 515. Like the token value parameter 515, this previously allowed data parameter 540 is read-only for the packet processing threads 405-420 but can be written to by the QoS update thread 425.

Figure 6:
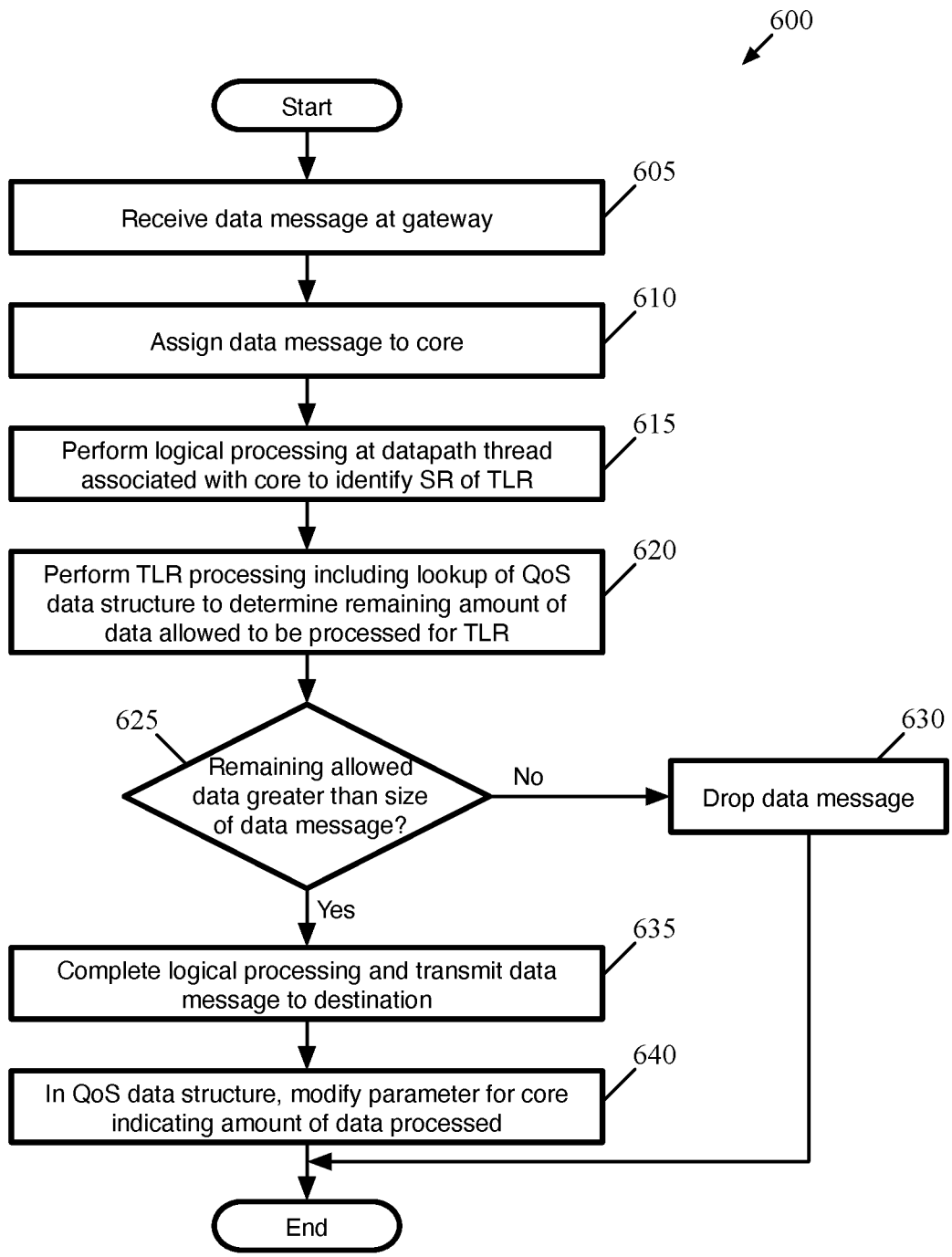
FIG. 6 conceptually illustrates a process of some embodiments for processing a data message at a gateway.

FIG. 6 conceptually illustrates a process 600 of some embodiments for processing a data message at a gateway. The process 600 is performed by the gateway datapath (e.g., the datapath daemon 400) in some embodiments upon receipt of a data message. Specifically, in some embodiments, much of the process (once a data message has been assigned to a core) is performed by one of the packet processing threads of the gateway datapath.

As shown, the process 600 begins by receiving (at 605) a data message at the gateway. This data message may be an ingress data message (e.g., received from an external network) for which the gateway is the first hop for logical network processing or an egress data message (e.g., received from a host computer at which the source logical network endpoint for the data message operates) for which the gateway is not the first hop for logical network processing.

Next, the process 600 assigns (at 610) the data message to one of the cores of the gateway device. As mentioned, this operation may use a hash-based load balancing technique such as receive side scaling (RSS) that distributes data messages across the different cores. Such techniques may assign different data messages belonging to the same tenant logical network to different cores (while consistently assigning data messages belonging to the same data flow to the same core).

Once the data message has been assigned to a core, in some embodiments the datapath thread for that core performs the remainder of the process 600. In some embodiments, the data message is assigned to a queue associated with that core, and thus there may be a short latency while earlier data messages in the queue are processed, before the process 600 continues for the data message.

As shown, the process 600 (i.e., the datapath thread associated with the core to which the data message was assigned) performs (at 615) logical processing to identify a centralized routing component of a TLR of a tenant logical network as the next stage of the processing pipeline for the data message. This processing may involve one or more stages of processing depending on (i) the direction of the data message (ingress or egress) and (ii) the architecture of the logical network to which the data message belongs. For example, this logical processing might involve various logical switches, other logical routers (e.g., multiple components of a PLR, a distributed routing component of the same TLR), distributed firewall, NAT, and/or load balancing.

Next, the process 600 performs (at 620) processing for the centralized routing component of the TLR (as part of the logical processing pipeline), which includes a lookup of the QOS data structure to determine the remaining amount of data allowed to be processed by the TLR. The configuration data for the TLR SR processing stage, in some embodiments, includes a reference (e.g., a pointer) to the specific QoS data structure for the tenant router and data message direction, as the gateway device stores numerous different such QoS data structures.

In some embodiments, the datapath thread simply reads the token value parameter from the appropriate QoS data structure to determine the remaining amount of data allowed to be processed for the TLR SR in the current message direction. In other embodiments, however, the datapath thread also accounts for previous data messages processed for the TLR SR since the last update to the token value parameter. In this case, the datapath thread subtracts from the token value parameter this amount of data processed since the last update to the token value. As described below by reference to FIG. 7, in some embodiments this amount is computed based on (i) the processed data parameters and (ii) an additional parameter that indicates the amount of data that had already been processed as of the last update to the token value.

The process 600 then determines (at 625) whether the remaining allowed data (however this amount is calculated) is greater than the size of the current data message (i.e., by comparing the two values). If the data message is too large, then the process 600 drops (at 630) the data message, to avoid violating the rate restrictions for the particular tenant. It should be noted that if the datapath thread only reads the token value (and does not account for other data messages processed since the last interval), then small temporary violations of the burst size and/or rate restriction for the TLR are possible (though these data messages would still be accounted for at the next update to the token value, making that value smaller for the subsequent interval).

If the data message is not too large, then the process 600 completes (at 635) logical processing and transmits the data message to the destination. This includes the routing for the TLR as well as other logical processing stages, again depending on the direction of the data message (ingress or egress) and the architecture and configuration of the logical network. As at operation 615, these logical processing stages might include various logical switches, other logical routers (e.g., multiple components of a PLR, a distributed routing component of the same TLR), distributed firewall, NAT, and/or load balancing. In addition, for ingress data messages, transmitting the data message often involves encapsulating the data message (e.g., using VXLAN, GENEVE, STT, or other encapsulation).

In addition, the process 600 modifies the processed data parameter for the core to which the data message is assigned (i.e., the only parameter for which the packet processing thread has write privileges) to account for the now-processed data message. In some embodiments, this operation is actually performed as part of the processing stage for the SR of the TLR, rather than after completing logical processing and transmitting the data message.

In some embodiments, the gateway datapath also uses a flow cache, which is described in further detail in U.S. Pat. No. 10,084,726, incorporated by reference above. This flow cache allows for faster processing of subsequent data messages in a data flow, so that the datapath does not need to execute the full processing pipeline for each data message. Instead, based on a quick lookup on the data message headers, a cache entry specifies all of the actions to take on a data message. For data flows that are processed by a logical router with a rate limit (i.e., TLR SR processing), some embodiments include an action in the flow cache entry that specifies to (i) check the token value of the correct QoS data structure to determine whether to allow or drop the data message and (ii) update the appropriate processed data parameter of the QoS data structure if the data message is allowed.

Figure 7:
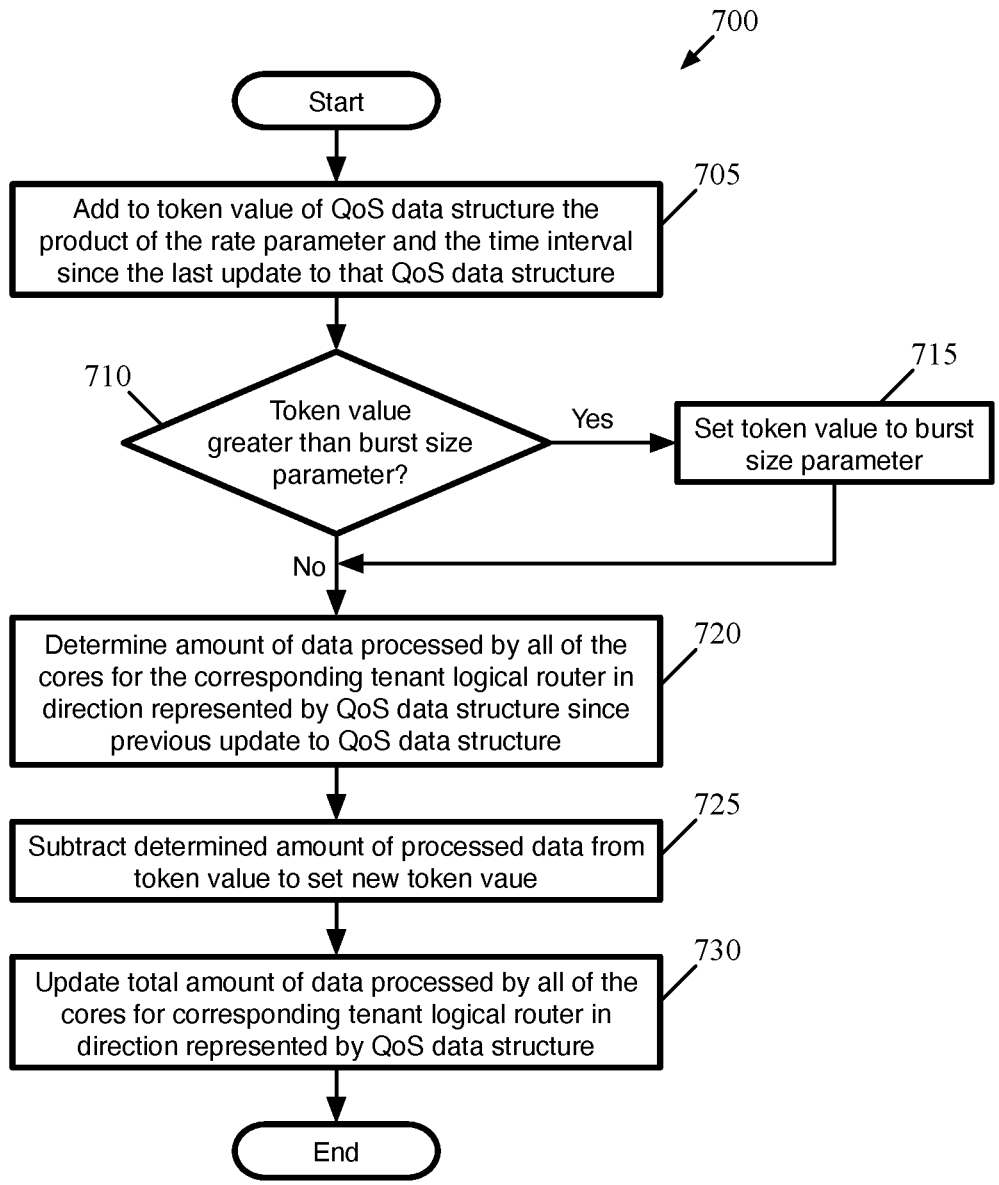
FIG. 7 conceptually illustrates a process of some embodiments for updating the token value parameter of a QoS data structure.

As mentioned, the QoS update thread adjusts the token values for each of the QoS data structures at regular intervals in some embodiments. FIG. 7 conceptually illustrates a process 700 of some embodiments for updating the token value parameter of a QoS data structure. This process 700 (or a similar update process) is performed by the QoS update thread of the gateway datapath for each QoS data structure (e.g., at the time intervals specified for each QoS data structure). These time intervals, in some embodiments, can be automatically and/or manually adjusted. For instance, some embodiments use a default of 1 microsecond, but can change this timer automatically or manually (e.g., based on analysis of the accuracy of the token values for a given logical router).

As shown, the process 700 begins (i.e., when the time interval for updating the particular QoS data structure has expired) by adding (at 705) to the token value of the QoS data structure the product of the bandwidth (committed rate) parameter (of that QoS data structure) and the time interval since the last update to the QoS data structure. In general, this time interval is the interval specified for the data structure. However, some embodiments give priority to the packet processing threads, such that if those are too busy the QoS update thread may be scheduled for slightly later. In this case, the time interval used for the calculation could be larger than the specified time interval.

The process 700 then determines (at 710) whether the token value (after the addition at 705) is greater than the burst size parameter. If the token value exceeds the burst size parameter, the process sets (at 715) the token value to the burst size parameter (i.e., reducing the token value). As mentioned, the burst size parameter sets a cap on the token value parameter. This prevents a logical network that has very little traffic for a sustained period of time from building up an extremely large token value parameter and then occupying all of the bandwidth in a sudden burst of traffic. In some embodiments, the burst size for a given QoS data structure is constrained such that it must be equal to or larger than the product of the bandwidth (committed rate) parameter for that QoS data structure and the time interval at use. This means that if the token value parameter has been dropped to zero, the full complement of data can always be added to the token value in the next update. In addition, some embodiments require that the burst size be greater than or equal to the maximum transmission unit (MTU) size of the port of the TLR, so that data messages up to the size of the MTU will have the ability to be transmitted, so long as the token value parameter is full.

Next, the process determines (at 720) the amount of data processed by all of the cores for the corresponding tenant logical router in the direction represented by the QoS data structure since the last update to the QoS data structure. In some embodiments, the update thread computes this data amount by adding the consumption parameters for each of the cores together, which works if the update thread also resets these parameters at each update. As mentioned, however, in some embodiments these consumption parameters are read-only for the update thread, and are only added to by their respective packet processing threads. However, the QoS update thread of some embodiments also stores the previously allowed data parameter indicating the previous consumption parameter total as of the last update. In this case, subtracting this last parameter from the total of the consumption parameters provides the amount of relevant data processed by all of the cores since the last update to the QoS data structure, without affecting the ability of the packet processing cores to continue writing to the consumption parameters.

The process 700 then subtracts (at 725) this determined amount of data processed since the last update from the token value computed at 705-715, in order to set the new token value for use by the packet processing threads until the next update. In some embodiments, the token value is not allowed to drop below zero, so an additional comparison is performed and if the subtracted value is less than the existing token value, the token value is simply set to zero.

Lastly, the process 700 updates (at 730) the total amount of data processed by all of the cores for the corresponding tenant logical router in the direction represented by the QoS data structure (i.e., the previously allowed data parameter of the QoS data structure). This is the amount used at 720 to determine the amount of data processed since the previous update to the QoS data structure. In some embodiments, the update thread computes the updated value of this parameter by adding the amount computed at 720 (the amount of data processed since the previous update) to the current value of the parameter. The process then ends.

It should be noted that while the process 700 uses the burst size as a cap after the addition of the product of the rate parameter and interval (but before the subtraction of the processed data), other embodiments perform this comparison after both the addition and subtraction operations have been performed. In some embodiments, before modifying the token value by adding the product of the rate parameter and the interval and subtracting the newly processed data, some embodiments subtract the newly processed data from the product of the rate parameter and the interval. This difference is then added to the existing token value, using the burst size as a cap (and zero as a minimum value).

Figure 8:
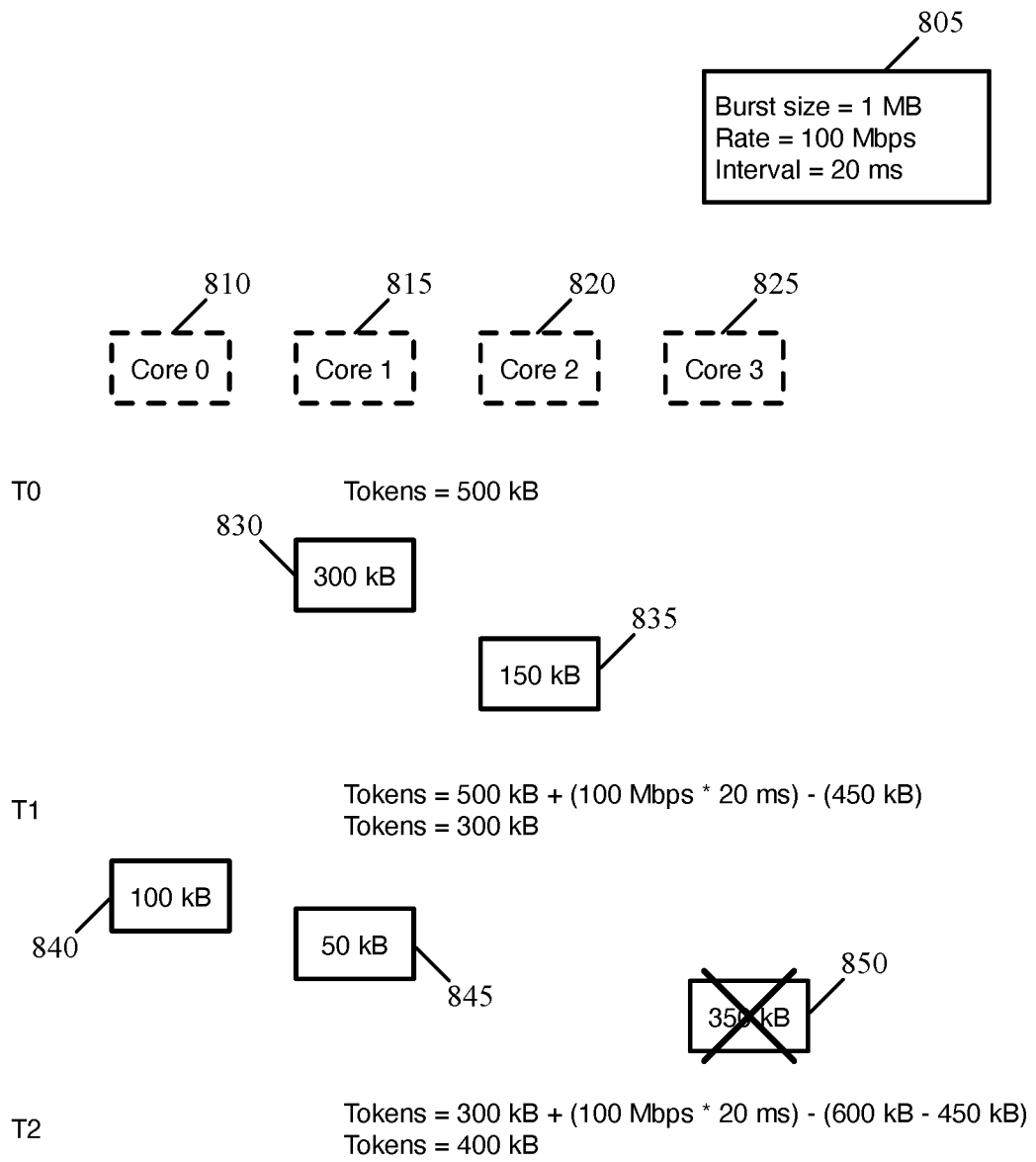
FIG. 8 conceptually illustrates an example of the use and updating of the token value parameter of a QoS data structure over multiple time intervals, according to some embodiments.

FIG. 8 conceptually illustrates an example of the use and updating of the token value parameter of a QoS data structure over multiple time intervals, according to some embodiments. As shown by the box 805, the burst size parameter for this QoS data structure is 1 MB, the committed rate parameter is 100 Mbps, and the time interval for updating is 20 ms. The figure illustrates that there are four cores 810-825 over which data messages may be distributed, and initially (at time T0) the token value parameter of the QoS data structure is set to 500 kB.

Between time T0 and time T1, the gateway datapath processes two data messages for the TLR with which the QoS data structure is associated (and in the direction with which the QoS data structure is associated). The data message 830 is processed by the packet processing thread associated with core 815 (and has a size of 300 kB) while the data message 835 is processed by the packet processing thread associated with core 820 (and has a size of 150 KB). As such, at time T1 the token value is set to 500 KB (the previous token value)+250 kB (the rate parameter multiplied by the time interval between T0 and T1)−450 KB (the total amount of data processed in the relevant direction by the relevant TLR between T0 and T1), which is 300 kB.

Between time T1 and time T2, the gateway datapath processes three data messages for the TLR with which the QoS data structure is associated (and in the direction with which the QoS data structure is associated). The data message 840 is processed by the packet processing thread associated with core 810 (and has a size of 100 KB), while the data message 845 is processed by the packet processing thread associated with core 815 (and has a size of 50 KB). The next data message 850 is assigned to the packet processing thread associated with core 825. This data message 850 has a size of 350 kB, larger than the current token value parameter, and is therefore dropped by the gateway datapath. At time T2 the token value is updated to 300 KB (the previous token value)+250 kB (the rate parameter multiplied by the time interval between T0 and T1)−150 KB (the total amount of data processed in the relevant direction by the relevant TLR between T1 and T2, computed by subtracting the total amount processed prior to T1 (450 kB) from the total amount processed overall (600 kB)). This new total is 400 kB.

Figure 9:
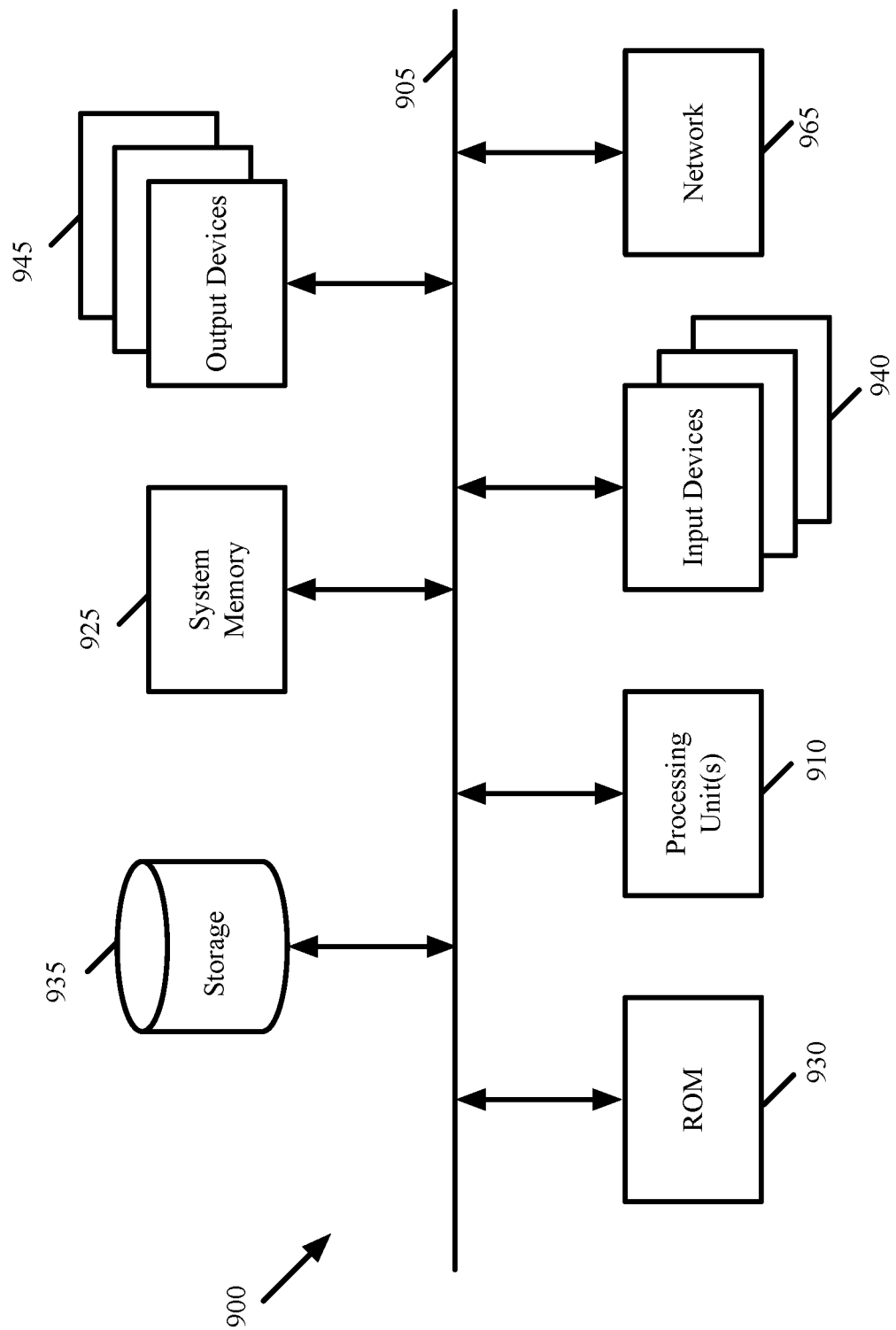
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 6 and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for managing quality of service (QOS) for a plurality of tenant logical networks, the method comprising:
providing a gateway datapath that executes on a gateway device to implement tenant logical routers for the plurality of different tenant logical networks and process traffic between the tenant logical networks and an external network;
receiving a data message for a particular tenant logical network at the gateway device;
executing a set of processing stages to process the data message, the set of processing stages comprising a processing stage for a particular tenant logical router of the particular tenant logical network; and
as part of the processing stage for the particular tenant logical router, using a QoS data structure specific to the particular tenant logical router to determine whether to allow the data message, wherein the gateway device stores at least one separate QoS data structure for each of a set of the tenant logical routers, and wherein using the QoS data structure specific to the tenant logical router comprises comparing a size of the data message to a current token value for the QoS data structure for the particular tenant logical router to determine the remaining amount of data allowed to be processed by the particular tenant logical router.

2. The method of claim 1 further comprising updating the QoS data structure specific to the particular tenant logical router based on a size of the data message.

3. The method of claim 1, wherein the gateway device stores, for each tenant logical router of the set of tenant logical routers, (i) a first QoS data structure for data traffic entering the logical network from the external network and (ii) a second QoS data structure for data traffic exiting the logical network to the external network.

4. The method of claim 1, further comprising updating the token value of the QoS data structure for the particular tenant logical router by (i) subtracting from the token value the amount of data processed for the particular tenant logical router since a prior update to the token value and (ii) adding to the token value an amount of data equal to the bandwidth parameter of the QoS data structure for the particular tenant logical router multiplied by an amount of time from the prior update to the current updating of the token value.

5. The method of claim 4, wherein the addition to the token value is capped by the burst size parameter.

6. The method of claim 4, wherein configuration data for the processing stage for the particular tenant logical router comprises a specification of the QoS data structure specific to the particular tenant logical router.

7. The method of claim 1, wherein the data message is a first data message, the particular tenant logical network is a first tenant logical network, the particular tenant logical router is a first tenant logical router, the set of processing stages is a first set of processing stages, and the QoS data structure is a first QoS data structure, the method further comprising:
receiving a second data message for a second tenant logical network at the gateway device;
executing a second set of processing stages to process the second data message, the second set of processing stages comprising a processing stage for a second tenant logical router of the second tenant logical network; and
as part of the processing stage for the second tenant logical router, using a second QoS data structure specific to the second tenant logical router to determine whether to allow the second data message.

8. The method of claim 1, wherein:
the gateway device comprises a set of processing units with a plurality of cores available for processing data messages;
the set of processing stages for the data message is executed by a particular one of the available cores to which the data message is assigned; and different data messages for the particular tenant logical network are assigned to different available cores of the gateway device.

9. The method of claim 8, wherein the different data messages for the particular tenant logical network and for other logical networks are assigned to the different available cores using a hash function that does not account for the tenant logical networks to which the data messages belong.

10. The method of claim 8, wherein each respective QoS data structure for a respective tenant logical router comprises a separate parameter for each available core that indicates an amount of data that has been processed by the core for the respective tenant logical router.

11. The method of claim 10 further comprising, as part of the processing for the particular tenant logical router, updating the parameter for the particular core based on a size of the data message.

12. The method of claim 10, wherein each respective available core updates the respective parameter for the respective core in the QoS data structure for a respective tenant logical router when the respective core processes a data message for the respective tenant logical router.

13. The method of claim 10, wherein each respective available core executes a respective thread that is allowed to read the token values of the QoS data structures and write to the respective parameter for the respective core.

14. The method of claim 13 further comprising executing an additional thread that is not tied to any of the available cores of the gateway device, wherein the additional thread updates the token values of the QoS data structures based on (i) the separate parameters of the QoS data structures for each available core and (ii) bandwidth parameters of the QoS data structures.

15. A non-transitory machine readable medium storing a gateway datapath program for execution by a set of processing cores of a gateway device, the gateway datapath program comprising sets of instructions for:
providing tenant logical routers for a plurality of different tenant logical networks and process traffic between the tenant logical networks and an external network, the gateway datapath program managing quality of service (QOS) for the plurality of tenant logical networks;
receiving a data message for a particular tenant logical network at the gateway device;
executing a set of processing stages to process the data message, the set of processing stages comprising a processing stage for a particular tenant logical router of the particular tenant logical network; and
as part of the processing stage for the particular tenant logical router, using a QoS data structure specific to the particular tenant logical router to determine whether to allow the data message, wherein (i) the QoS data structure specific to the particular tenant logical router is used to determine whether to allow each data message of a plurality of data messages for which the processing stage for the particular tenant logical router is executed, (ii) the gateway device stores at least one separate QoS data structure for each of a set of the tenant logical routers, and (iii) the set of instructions for using the QoS data structure specific to the tenant logical router comprises a set of instructions for comparing a size of the data message to a current token value for the QoS data structure for the particular tenant logical router to determine the remaining amount of data allowed to be processed by the tenant logical router.

16. The non-transitory machine readable medium of claim 15, wherein the program further comprises a set of instructions for updating the QoS data structure specific to the particular tenant logical router based on a size of the data message.

17. The non-transitory machine readable medium of claim 15, wherein the gateway datapath program further comprises a set of instructions for updating the token value of the QoS data structure for the particular tenant logical router by (i) subtracting from the token value the amount of data processed for the particular tenant logical router since a prior update to the token value and (ii) adding to the token value an amount of data equal to the bandwidth parameter of the QoS data structure for the particular tenant logical router multiplied by an amount of time from the prior update to the current updating of the token value.

18. The non-transitory machine readable medium of claim 15, wherein:
a plurality of the processing cores of the gateway device are available to the gateway datapath for processing data messages;
the set of processing stages for the data message is executed by a particular one of the available cores to which the data message is assigned; and
different data messages for the particular tenant logical network are assigned to different available cores of the gateway device.

19. The non-transitory machine readable medium of claim 18, wherein each respective QoS data structure for a respective tenant logical router further comprises a separate parameter for each available core that indicates an amount of data that has been processed by the core for the respective tenant logical router.

20. The non-transitory machine readable medium of claim 19, wherein:
each respective available core executes a respective thread that is allowed to read the token values of the QoS data structures and write to the respective parameter for the respective core; and
the gateway datapath further comprises a set of instructions for executing an additional thread that is not tied to any of the available cores of the gateway device, wherein the additional thread updates the token values of the QoS data structures based on (i) the separate parameters of the QoS data structures for each available core and (ii) bandwidth parameters of the QoS data structures.

* * * * *